(12) United States Patent
Klettke

(10) Patent No.: US 9,096,319 B2
(45) Date of Patent: Aug. 4, 2015

(54) BOARDING AID

(71) Applicant: AIRBUS OPERATIONS GMBH, Hamburg (DE)

(72) Inventor: Marcus Klettke, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 295 days.

(21) Appl. No.: 13/721,732

(22) Filed: Dec. 20, 2012

(65) Prior Publication Data
US 2013/0161450 A1 Jun. 27, 2013

Related U.S. Application Data

(60) Provisional application No. 61/579,240, filed on Dec. 22, 2011.

(30) Foreign Application Priority Data

Dec. 22, 2011 (DE) .......................... 10 2011 122 063

(51) Int. Cl.
| | |
|---|---|
| *B64C 1/32* | (2006.01) |
| *B64D 11/00* | (2006.01) |
| *G06Q 10/02* | (2012.01) |
| *G06Q 50/30* | (2012.01) |

(52) U.S. Cl.
CPC ................ *B64D 11/00* (2013.01); *G06Q 10/02* (2013.01); *G06Q 50/30* (2013.01)

(58) Field of Classification Search
CPC ...... B64D 9/00; B64D 2009/00; B64D 11/00; G06Q 10/06–10/067; G06Q 11/02; G06Q 50/30

USPC .............................. 244/137.2; 705/7.11–7.42
See application file for complete search history.

(56) References Cited

U.S. PATENT DOCUMENTS

| | | | | |
|---|---|---|---|---|
| 4,774,514 | A | * | 9/1988 | Hildebrandt et al. .......... 340/971 |
| 7,178,954 | B2 | * | 2/2007 | Blechschmidt ............... 362/471 |
| 8,510,086 | B1 | * | 8/2013 | Winkler et al. .................... 703/6 |
| 8,618,909 | B1 | * | 12/2013 | Clausen ......................... 340/5.7 |
| 2006/0206353 | A1 | * | 9/2006 | Buschi et al. ..................... 705/1 |
| 2006/0278764 | A1 | * | 12/2006 | Zhao .......................... 244/137.2 |
| 2007/0265890 | A1 | * | 11/2007 | Curtis ................................ 705/5 |
| 2008/0261510 | A1 | * | 10/2008 | Lin ............................... 455/3.01 |
| 2013/0068890 | A1 | * | 3/2013 | Boren ........................ 244/137.2 |
| 2013/0268303 | A1 | * | 10/2013 | Messier ............................ 705/5 |

FOREIGN PATENT DOCUMENTS

| | | |
|---|---|---|
| DE | 10 2009 058 848 | 6/2011 |
| WO | WO 2009149491 A1 * | 12/2009 |

* cited by examiner

*Primary Examiner* — Philip J Bonzell
(74) *Attorney, Agent, or Firm* — Dickinson Wright PLLC

(57) ABSTRACT

A computing unit allocates boarding paths, available for boarding a transport unit, in particular an aircraft, to passengers of the transport unit. An associated method allocates boarding paths, available for boarding the transport unit to passengers of the transport unit. A computer program carries out the method, and a directing system directs passengers of the transport unit along boarding paths available for boarding the transport unit. The computing unit is configured to form two or more changeable seat groups from a plurality of seats provided in the transport unit and to allocate the boarding paths, available for boarding the transport unit, to the two or more seat groups formed.

20 Claims, 3 Drawing Sheets

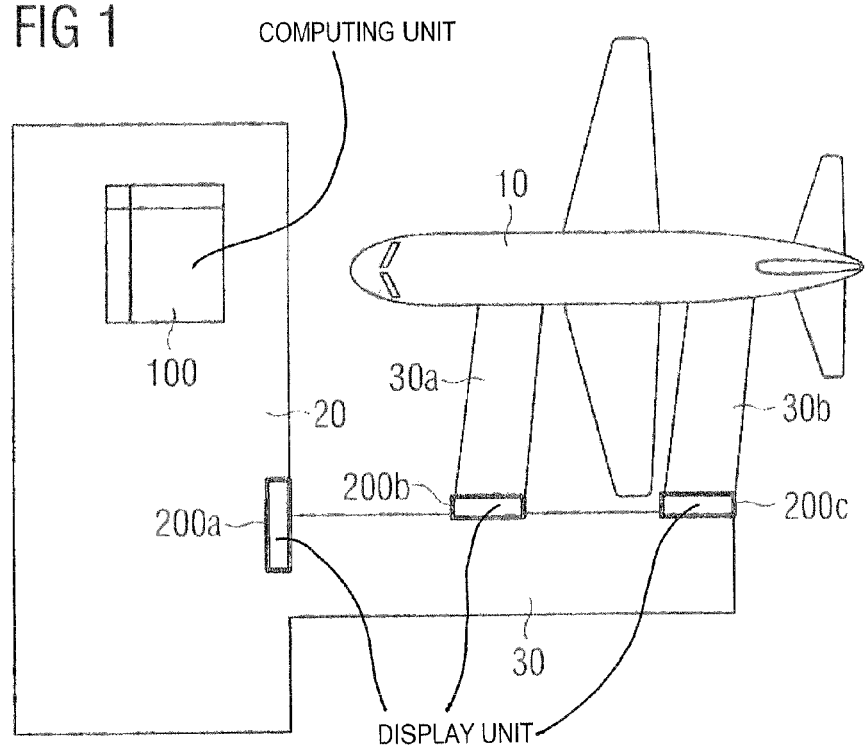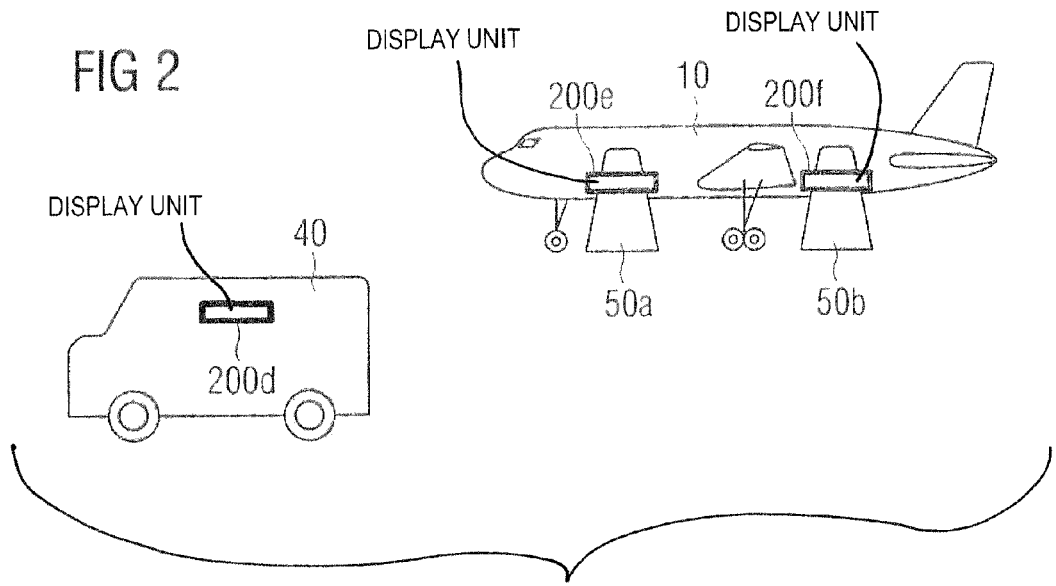

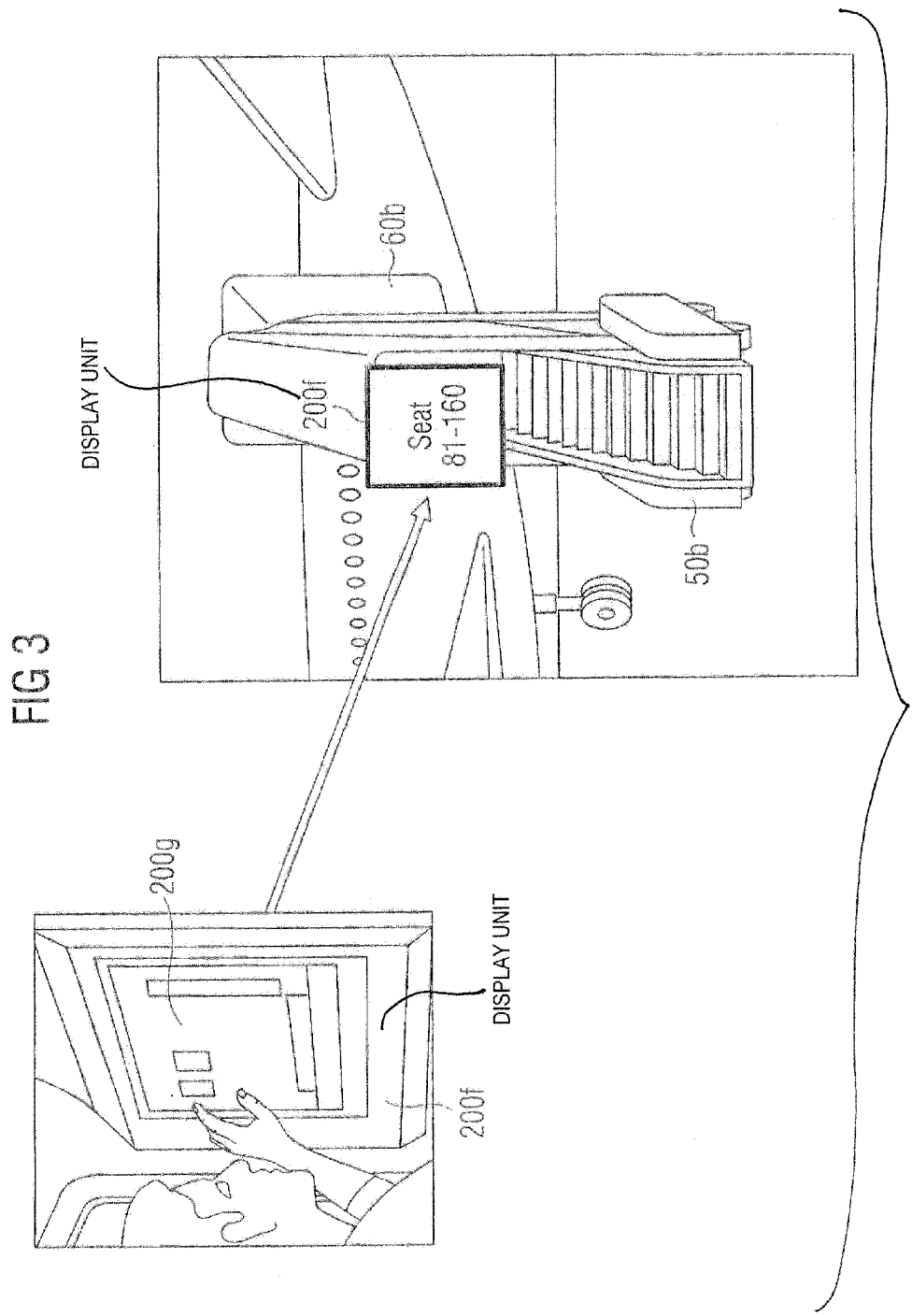

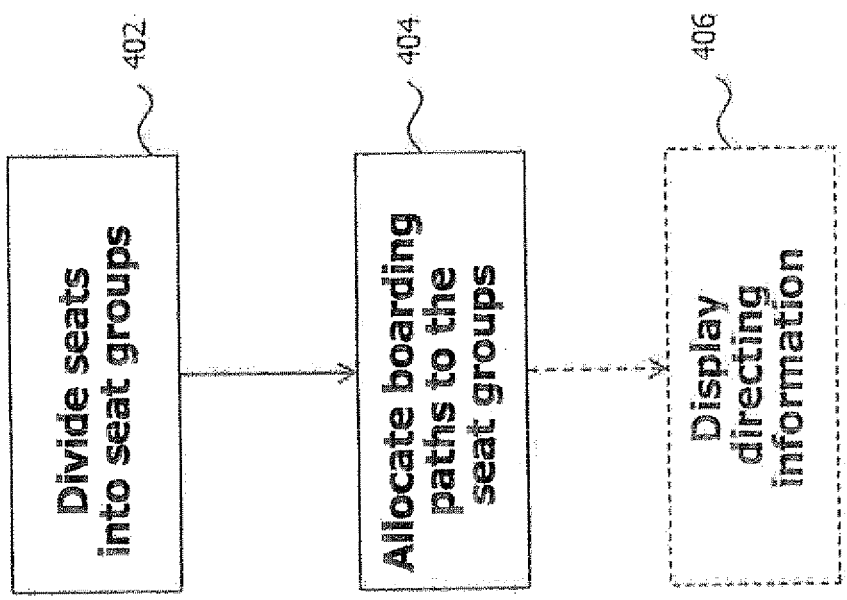

BOARDING AID

CROSS REFERENCE TO RELATED APPLICATION

This application is entitled to and claims the benefit of German patent application no. 10 2011 122 063.5 and U.S. provisional application No. 61/579,240, both filed Dec. 22, 2011, the disclosures of which, including the specification, drawings and abstract, are incorporated herein by reference in their entirety.

FIELD

The present invention relates to a computing unit for allocating boarding paths, available for boarding a means of transport, in particular an aircraft, to passengers of the means of transport, an associated method for allocating boarding paths, available for boarding a means of transport, in particular an aircraft, to passengers of the means of transport, a computer program for carrying out the method, and a directing system for directing passengers of a means of transport, in particular of an aircraft, along boarding paths available for boarding the means of transport.

BACKGROUND

Before means of transport for conveying passengers, such as aircraft, buses, trains or ships, take off or depart after a stop, a boarding procedure of the passengers to be conveyed by the means of transport takes place. With respect to aircraft, this boarding procedure is normally simply referred to as boarding. In passenger air traffic, boarding is understood to mean the phase between calling the passengers to proceed to the gate from which the aircraft standing ready for the booked flight can be reached, and the time when the aircraft doors are locked. After completion of the boarding procedure, the on-board responsibility passes from the ramp agent (an airline or airport employee working on the ground, who prepares aircraft for departure) to the captain.

In the case of larger means of transport, such as larger aircraft, often passengers whose seats are in the rear cabin section are allowed on board first. In the case of very large aircraft, sometimes passengers are called according to seat rows (from the rear to the front), in order to speed up the boarding. After the rear seats, the passengers for the middle seats and finally the passengers for the front seat rows are requested to board.

In the case of means of transport with a plurality of boarding paths for boarding the means of transport (such as for example a plurality of entrances or a plurality of paths to the plurality of entrances), the passengers usually board in an uncoordinated manner, which may lead to crossings of the passengers' paths, inter alia, in the means of transport itself.

SUMMARY

It is an object of the present invention to provide a computing unit and a method for allocating boarding paths, available for boarding a means of transport, to passengers of the means of transport, a computer program for carrying out the method and a directing system for directing passengers of a means of transport along boarding paths which are available for boarding the means of transport, which allow for quick and orderly boarding of the passengers.

This object is achieved by a computing unit, a directing system, a method, and a computer program according to attached independent claims. Specific embodiments follow in each case from the dependent claims.

The computing unit according to the invention for allocating boarding paths, available for boarding a means of transport, in particular an aircraft, to passengers of the means of transport is configured to form two or more changeable seat groups from a plurality of seats provided in the means of transport and to allocate the boarding paths, available for boarding the means of transport, to the two or more seat groups formed.

The term boarding path can be understood, for example, to mean a route which the passengers cover to get from the place at which they are called or requested to board to the place at which the boarding procedure is completed for them. The boarding procedure may, for example, be considered to be completed when the passengers are on board the means of transport. With reference to aircraft, it is possible to understand the term of boarding path to mean the route which the passengers have to cover from the gate until they are in the aircraft (after passing through the aircraft entrances) and at the allocated seat. Furthermore, the boarding path may also be a partial section of the aforementioned paths. For example, the available boarding paths may also be only the choice of between two or more entrances leading into the means of transport.

Two boarding paths may then be considered as different if at least a partial section of the boarding path is different, i.e. the boarding paths may differ but do not have to be completely different.

Two or more boarding paths may be available for the passengers, for example, if they have the choice between two entrances leading into the means of transport. Mention may be made here, by way of example, that in the case of trains a plurality of entrances to the train may be available to the passengers on a platform. The same applies with respect to aircraft. In that case too, there may be two or more entrances available to the passengers as boarding paths into the aircraft. Furthermore, different boarding paths may also be formed by providing two or more gangways for boarding or leaving a ship or aircraft and/or or two or more passenger boarding bridges (PBB) and/or two or more buses as feeders to the means of transport (e.g. to the aircraft) and/or two or more entrances into one and the same bus as feeder to the means of transport (e.g. to the aircraft). It is also possible for a single passenger boarding bridge to have two or more fingers and thereby form different boarding paths.

All of the partial sections mentioned above by way of example may be combined to form two or more boarding paths available for boarding the means of transport.

Without coordination of the boarding procedure, the passengers may choose freely from the available boarding paths. If the passengers use the different available boarding paths in an uncoordinated or uncontrolled manner, this may be inefficient. For example, some passengers might choose a boarding path unfavourable for the seat allocated to them, such as for example an unfavourable entrance, and accordingly have a longer distance to cover outside or inside the means of transport, which may also result in crossings with boarding paths of other passengers outside and inside the means of transport. This may result in time delays during the boarding procedure of the passengers into the means of transport.

The computing unit according to the invention is configured to form two or more changeable seat groups from the plurality of seats provided in the means of transport. The computing unit allocates the available boarding paths to these two or more seat groups formed. Through the allocation of the boarding path(s) suitable for the respective seat group, the boarding of the passengers can be made more efficient.

The seat groups formed are allocated, for example, one or more boarding paths which result in minimum distances for the passengers outside or inside the means of transport. The computing unit may, for example, allocate the shortest boarding path to each seat group. Furthermore, it is possible to allocate to the seat groups in each case the boarding path(s) resulting in a minimum number of crossings of the paths in the means of transport.

For example, it is possible for each of the two or more seat groups formed to be allocated in each case exactly one of the boarding paths. The exactly one allocated boarding path may be the path from the starting point up to the passenger's seat which is optimal, e.g. the shortest (both from the point of view of time and distance). It is conceivable for seat groups of the same size or different sizes to be formed by the computing unit.

According to one possible realisation, the computing unit may take account of how many entrances for boarding the means of transport are available and allocate to the seat groups in each case the entrance from which the seats of the seat group have the shortest distance. This results in minimum distances to be covered in the means of transport itself (to reach the seat). Furthermore, this may result in a minimisation of the crossings of the passenger' paths in the aircraft. According to a first variant of the possible realisation, the computing unit may determine a boundary seat up to which the seats form a first seat group. The further seats (after the boundary seat) may form a second group or be subdivided into further seat groups by determining further boundary seats. For example, the boundary seat may be chosen as that which is the same distance away from the two entrances of the means of transport. Instead of a boundary seat, a boundary row may be determined and used for the group formation in the same way. According to a second variant, the computing unit may determine a boundary line between two rows of the means of transport, the seats on one side of the boundary line being assigned as a first seat group to a first entrance and the seats located on the other side of the boundary line being assigned as a second seat group to a second entrance. The boundary line may be the same distance away from both entrances. In accordance with the second variant, as well as in the first variant, more than two seat groups may also be formed by using two or more boundary lines.

The two or more seat groups formed may be changed repeatedly, for example periodically. The computing unit may, for example, be configured to carry out, repeatedly, in particular periodically, the formation of the two or more seat groups. Furthermore, the computing unit may be configured to carry out the allocation of the boarding paths to the two or more seat groups formed, repeatedly, in particular periodically. The seat groups and/or the allocation may also be carried out again when a passenger or a predetermined (e.g. variable) number of passengers have boarded the means of transport.

The computing unit may take account of a plurality of items of information for the formation of the seat groups and the allocation of the boarding paths to the two or more seat groups formed. For example, the type of the means of transport may be taken into account. With regard to aircraft, it is conceivable for the computing unit to take account of the aircraft type. Furthermore, it is possible for the computing unit to be configured to carry out the formation of the two or more seat groups and the allocation of the boarding paths to the two or more seat groups formed on the basis of information about the passengers and/or information about the plurality of seats provided in the means of transport. This information may be inputted into the computing unit or transmitted in a wireless and/or wired manner to the computing unit. At least some of the information, e.g. the information about the passengers, may also be detected automatically by the computing unit.

The information about the passengers (passenger information) may be information about the number of passengers who have boarded the means of transport and/or information about the seats of the passengers who have boarded the means of transport. Furthermore, it is possible for the passenger information to include information about the person of the passengers, for example about whether the passengers have a special status (e.g. frequent flyer status, diplomatic status, first-/business-class passengers etc.) or degree of fame (e.g. politicians, people in public life). This information may be sent to the computing unit or inputted into the computing unit. It is conceivable for the information about the number and/or the seats and/or the person of the passengers who have boarded to be determined continuously. This information may, for example, be read out with the aid of Radio Frequency IDentification (RFID) readers from, for example, RFID transponders integrated into the flight ticket, and transmitted to the computing unit.

The information about the plurality of seats (seat information) may include information about the number of seats available for the passengers in the means of transport (seat capacity) and/or information about the number of seats actually booked by the passengers and/or information about the arrangement of the seats available in the means of transport. The seat information too may be inputted into the computing unit or transmitted to the computing unit.

Based on this information or part of this information, the computing unit may perform the group formation and the assignment of the boarding paths. According to a simple conceivable realisation, the computing unit may perform the group division from the actual seat capacity of the aircraft (which has, for example, been communicated to the computing unit or which the computing unit has derived from the aircraft type and the airline) and from the actual seat booking (which has, for example, been communicated to the computing unit). By taking account of the actual seat booking, it is possible to form seat groups which may have a different number of available seats but an equal number of booked seats. Each of the seat groups may, for example, have the same number of actually booked seats. As a result, the boarding of the passengers can be further improved. Furthermore, through the repeated checking of which passengers have already boarded, the up-to-date seat occupancy can be determined. The information about the up-to-date seat occupancy (the information about the passengers who have actually boarded) may be transmitted to the computing unit and evaluated there. The computing unit can then form seat groups which correspond in the number of the currently unoccupied seats. This enables adaptive adjustment of the passenger flow.

The groups formed may also be changed by user-assisted inputs. In particular, the seat group formation may be changed by information inputted into the computing unit and/or by information transmitted to the computing unit. As a result, although the computing unit has determined a particular group formation and allocation, it is possible to deviate from this assignment manually. For example, it is conceivable that a group of people (e.g. first- and/or business-class passengers or particularly well-known passengers) have already entered the aircraft and are not to be disturbed by people walking past. In this case, this information can be inputted manually into the computing unit, and the computing unit can then block the boarding path along the passenger group or lead fewer passengers along it.

The computing unit may allow different languages in operation, input and display (also in succession).

The directing system according to the invention for directing passengers of a means of transport, in particular of an aircraft, along boarding paths available for boarding the means of transport comprises a computing unit as is/has been described herein and one or more display units, for example one or more monitors or displays. The one or more display units are configured to display directing information for directing the passengers along the boarding paths allocated to the seat groups by the computing unit.

To receive the directing information to be displayed, the one or more display units are connected to the computing unit in a wireless and/or wired manner. Put another way, the computing unit is connected to the one or more display units in a wireless and/or wired manner for the transmission of the directing information to be displayed. Accordingly, it is possible for at least a partial quantity of the display units to be connected in a wireless manner, and at least a partial quantity of the display units to be connected in wired manner, to the computing unit. A partial quantity here may also be understood as merely a single display unit.

The one or more display units may be arranged along the available boarding paths. With respect to aircraft, one or more display units may be arranged in the airport building, such as for example in a gate and/or at or in a passenger boarding bridge. For example, a display unit may be arranged at each finger or at each branch of the passenger boarding bridge. Furthermore, it is possible to place in each case a display unit in an apron bus or at the entrance of an apron bus for transporting the passengers to an aircraft. Furthermore, it is conceivable to place a display unit at each of the gangways leading to an entrance of the aircraft.

An input unit for inputting information for changing the displayed boarding path may be provided on one or more of the one or more display units, such as on a partial quantity of the one or more display units. This input unit may also be integrated as a touch-sensitive unit into the display unit (touchscreen). For example, a person monitoring the boarding procedure, such as a person of the airport personnel, in particular a ramp agent, may observe that changed boarding paths would enable quicker boarding. Thereupon, he can input information into a display unit in order to change the boarding path allocation and/or the group formation. The display unit can thereupon transmit the inputted information to the computing unit, which then can perform the group formation and boarding path assignment once again.

The one or more display units may also be configured as or may be displays of passengers' mobile terminals, e.g. mobile phones, smartphones or the like. In this respect, an application (in short: app) may be downloaded by passengers on their mobile terminals and then executed on the mobile terminals. When running, the app may be informed about the directing information by the computing unit and may then instruct the display of the mobile terminal (on which it is running) to display the directing information for the respective passenger using the mobile terminal. In this context, each mobile terminal and thus each display unit can provide user specific directing information to the user of the mobile terminal. The directing information may guide the passenger by displaying the directing information on the display (e.g. by means of arrows and the like). Additionally, audio information may be output for guiding the passenger.

The directing system may further comprise a detecting unit for detecting passengers who have boarded the means of transport. This unit may, for example, be an RFID reader which can detect that a passenger has boarded the means of transport. From the seat of the boarded passenger (which may, for example, be stored in an RFID transponder in the flight ticket and may be read out by the RFID reader), the computing unit may perform a new formation of the groups. For example, the ratio of the still unoccupied seats of both groups may be continuously kept constant.

The method according to the invention for allocating boarding paths, available for boarding a means of transport, in particular an aircraft, to passengers of the means of transport, comprises dividing, by means of a computing unit, a plurality of seats provided in the means of transport into two or more changeable seat groups, and allocating, by means of the computing unit, the boarding paths, available for boarding the means of transport, to the two or more seat groups. Furthermore, the method may include the step of displaying, by means of one or more display units, directing information for directing the passengers along the boarding paths allocated to the seat groups by the computing unit.

Furthermore, the invention relates to a computer program with program code means, which, when it is loaded in a computer or a processor (for example a microprocessor, microcontroller or digital signal processor (DSP)), or runs on a computer or processor (e.g. a microprocessor, microcontroller or DSP), causes the computer or processor (e.g. the microprocessor, microcontroller or DSP) to carry out the method described above. In addition, the invention relates to a program storage medium or computer program product having the said computer program.

Even if some of the above-described aspects have been described in relation to the computing unit and the directing system, these aspects may also be implemented as methods or as a computer program carrying out the method. In the same way, aspects described in relation to the method may be realised by suitable units in the computing unit or the directing system or be carried out by the computer program.

BRIEF DESCRIPTION OF DRAWINGS

Preferred embodiments of the present invention are explained below with reference to the appended schematic figures, in which:

FIG. 1 shows a schematic representation of a directing system according to a first embodiment having a computing unit according to one embodiment of the present invention;

FIG. 2 shows a schematic representation of part of a directing system according to a second embodiment which can be used with the computing unit from FIG. 1;

FIG. 3 shows a schematic representation of a display unit of the directing system from FIG. 2; and FIG. 4 shows a flow diagram of a method according to one embodiment of the present invention.

DETAILED DESCRIPTION OF EMBODIMENTS

Hereinbelow, without being limited thereto, specific details are set out in order to provide a complete understanding of the present invention. It is, however, clear to a person skilled in the art that the present invention may be used in other embodiments which may deviate from the details set out below.

It is clear to a person skilled in the art that the explanations set out below are/may be implemented using hardware circuits, software means or a combination thereof. The software means may be associated with programmed microprocessors or a general computer, an ASIC (Application Specific Integrated Circuit) and/or DSPs (Digital Signal Processors). Moreover, it is clear that even if the details below are described with reference to a method, they may also be realised in a suitable device unit, a computer processor and storage connected to a processor, the storage being provided with one or more programs which carry out the method when they are executed by the processor.

FIGS. 1 to 4 are described below with reference to an aircraft as the means of transport. However, the embodiments are not limited thereto, but may also be used in other means of transport, such as in buses, trains or ships.

Further, although the embodiments are described below with respect to display units arranged in fingers of a boarding bridge (first embodiment) or at gangways and an apron bus (second embodiment), the invention is not limited thereto, but the display units may equally also be displays of mobile terminals, e.g. mobile phones, smartphones or the like, using which the respective user of the mobile terminal can be informed about his/her boarding path by means of an application (in short: app) running on the mobile terminal. According to this alternative, each passenger is informed individually about his/her boarding path via his/her mobile terminal. However, the basic principles described below regarding the computation of boarding paths, formation of seat groups and presentation of directing information equally apply to this alternative.

In FIG. 1, an aircraft 10 which is connected via a passenger boarding bridge 30 to a gate 20 of an airport is shown schematically. The passenger boarding bridge 30 has, purely by way of example, two fingers 30a, 30b which each lead to an entrance of the aircraft 10. The passenger boarding bridge 30 forms the crossing from the gate 20 to the aircraft 10. In the example from FIG. 1, there are two boarding paths available to the passengers for boarding the aircraft 10. A first boarding path leads from the gate 20 via the front finger 30a into the front entrance of the aircraft 10. A second boarding path leads from the gate 20 via the rear finger 30b into the rear entrance of the aircraft 10.

If passengers board the aircraft 10 randomly, it can happen that passengers who are sitting in the rear part of the aircraft use the front entrance of the aircraft 10 and thus cross passengers in the aircraft 10 who have used the rear entrance although they are sitting in the front region of the aircraft 10. This delays the boarding procedure.

The directing system according to the embodiment shown for directing the passengers comprises a computing unit 100 according to one embodiment and three display units 200a, 200b, 200c. Even if purely by way of example, three display units are illustrated, the directing system may have any number, e.g. one, two, three, four, five, six or more than six, display units. The computing unit 100 is provided in the gate 20. Furthermore, a display unit 200a is placed before the crossing from the gate 20 to the passenger boarding bridge 30. The display units 200b, 200c are each arranged on one of the fingers 30a, 30b. To be more precise, the display unit 200b is to arranged before the entrance to the front finger 30a leading to the front entrance of the aircraft 10, and the other display unit 200c is arranged at the rear finger 30b leading to the rear entrance of the aircraft 10. The display units 200a, 200b, 200c may be connected to the computing unit 100 in a wireless and/or wired manner.

The computing unit 100 now takes account of information about the aircraft and/or the passengers in order to improve the boarding procedure. The information mentioned with reference to FIGS. 1 to 4 is to be understood as being purely by way of example, i.e. the computing unit 100 may also use only part of the information mentioned. For example, the computing unit 100 takes account of which aircraft type is concerned in the case of the aircraft 10. Furthermore, the computing unit 100 takes account of the airline to which the aircraft 10 belongs. This information may be inputted into the computing unit 100 by the airport personnel. Alternatively, the crew may transmit information about the aircraft type and/or the airline to the computing unit 100 wirelessly e.g. from the cockpit.

From the information about the aircraft type and/or the airline, the computing unit 100 can deduce how many seats are available for the passengers in the aircraft 10. From this, the computing unit 100 can determine the same number of groups of seats as there are boarding paths available. In the present case, the computing unit 100 determines two seat groups. For this purpose, the computing unit 100 can set a boundary line between the seat rows up to which the seats belong to the first seat group and from which the seats belong to the second seat group. Alternatively, the computing unit 100 can set a boundary seat up to which the seats belong to the first seat group and from which the seats belong to the second seat group. Irrespective of how the computing unit 100 forms the seat groups, the computing unit 100 will allocate a single boarding path to each of the two seat groups (alternatively, the allocation of more than one boarding path per seat group would also be possible). In the present case, the computing unit 100 stipulates that the passengers of the first seat group are to use the front boarding path (from the gate 20, into the passenger boarding bridge 30, via the front finger 30a through the front entrance) for boarding. In doing so, the computing unit 100 takes account of the fact that the distance to be covered by the passengers in the aircraft 10 from the entrance to their seat is at a minimum. Furthermore, the computing unit 100 stipulates that the passengers of the second seat group are to use the rear boarding path (from the gate 20, into the passenger boarding bridge 30, via the rear finger 30b through the rear entrance). In doing so, the computing unit 100 takes account of the fact that the distance to be covered by the passengers in the aircraft 10 from the entrance to their seat is at a minimum. In the present case, which is to be considered as an example, the computing unit 100 sets the boundary line such that the boundary line is at the same distance away from the two entrances of the aircraft 10.

After the allocation, the computing unit 100 transmits directing information, corresponding to the allocation, to the display units 200a, 200b, 200c. The display units 200a, 200b, 200c display the directing information and the passengers are directed accordingly. It may thus be displayed on the display unit 200a that all the passengers of the flight to be carried out by the aircraft 10 can board. Alternatively, subdivisions into seat rows or seats may already be displayed on the display unit 200a. The display unit 200b will accordingly display the seat rows (or seats) which belong to the first seat group, while the display unit 200c displays the seat rows (or seats) which belong to the second seat group. The passengers can thus see the optimum path for them.

The computing unit 100 may, however, take account of still further information for forming the seat groups and for allocating the boarding paths. For example, for forming the groups, the computing unit 100 may take account of which seats have actually been booked by passengers. In this way, seat groups with for example the same number of actually booked passengers may be formed. It is also possible to detect, with the aid of RFID readers, which passengers are already on board the aircraft 10. These RFID readers may, for example, recognise RFID transponders which are integrated into the flight tickets and which carry information about the particular seat. The RFID readers may be arranged at various positions along the boarding path or in the aircraft, such as for example on or in the vicinity of the display units 200b, 200c or on or in the vicinity of the entrances (e.g. at the end of the corresponding fingers) into the aircraft 10 or above the seats. This information may be transmitted, periodically or when a passenger has boarded, to the computing unit 100 which thereupon performs the seat group formation and allocation again. As a result, an adaptive procedure is provided, which always computes and displays the best (shortest or quickest) boarding paths for the passengers.

Additionally, manual inputs on the computing unit 100 or manual inputs on the display units may be taken into account by the computing unit 100. The information inputted into the display units 200a, 200b, 200c is then transmitted to the computing unit. For example, a ramp agent may notice that the finger 30a is blocked or that a congestion has arisen there. Thereupon, the ramp agent inputs into the display unit 200b that the passenger flow is to be diverted. This information is then transmitted to the computing unit 100 wirelessly. Thereupon, the computing unit performs the seat group formation and the allocation of the boarding paths again. For example, the computing unit 100 may markedly reduce the first seat group based on the information received, so that passengers of seat rows also located in the front region of the aircraft use the rear entrance of the aircraft. Alternatively, the boarding path via the first finger 30a may be completely diverted. This is displayed accordingly on the display units 200b, 200c.

FIG. 2 shows part of a directing system according to a second embodiment, which also includes the computing unit, provided in the gate 20, from FIG. 1. In FIG. 2, alternative boarding paths to the two boarding paths shown in FIG. 1 are illustrated. According to FIG. 2, the boarding paths lead from the gate 20 (shown in FIG. 1) via the apron bus 40 and the two gangways 50a, 50b into the aircraft 10. That is to say, two boarding paths are also shown in FIG. 2, namely a first boarding path from the gate 20 via the bus 40 and the front gangway 50a into the aircraft 10 and a second boarding path from the gate 20 via the bus 40 and the rear gangway 50b into the aircraft 10. A display unit 200d is arranged in the apron bus 40. Furthermore, a display unit 200e is arranged at the front gangway 50a and a display unit 200f is arranged at the rear gangway 50b. The display units 200d, 200e, 200f are connected to the computing unit wirelessly. In the same way as described in FIG. 1, the computing unit 100 may form seat groups and assign a boarding path to each of the seat groups.

Alternatively, even more boarding paths may be formed by a choice being made in the apron bus 40. For example, display units arranged at the entrances of the bus 40 could each display directing information. For example, passengers intending to use the front gangway 40a could be directed to the entrance to the bus which will be closer to the front gangway 50a. The same applies to the rear gangway 50b.

All of the display units from FIG. 1 and FIG. 2 may display their directing information in different languages. Furthermore, apart from free text, the display units may display logos, images or videos.

FIG. 3 shows details of the display unit 200f which is arranged at the rear gangway 50b to the rear entrance 60b. On the display unit 200f is displayed the directing information that the passengers of seats 81 to 160 are to use the rear gangway 50b. As can be seen in the enlarged view of the display unit 200f, the display unit 200f has a touchscreen 200g by way of example as input unit, so that user inputs can be inputted by touching the touchscreen 200g. As can be seen, the rear region of the aircraft, i.e. the second seat group, is already relatively full with passengers. Accordingly, it is to be expected that the majority of the remaining passengers will take the front boarding path via the gangway 50a and that congestion will occur there. This can be adjusted by the computing unit 100 performing a new group division as a result of a manual input on the display unit 200f (for example with the aid of the touchscreen 200g or another input unit) and transmission to the computing unit 100. In the exemplary case, the computing unit 100 will shift the boundary line between the seats forwards, so that the same number of passengers remain for both seat groups.

With reference to FIGS. 1 to 3, for the sake of brevity, only the display unit 200f was described as having a touchscreen 200g. However, any of the other display units 200a-200e described with reference to FIGS. 1 to 3 may also have a touchscreen 200g, as shown in FIG. 3, as input unit and/or another input unit.

FIG. 4 shows a flow diagram illustrating steps of a method according to one embodiment. In a first step 402, the seats available in the aircraft are divided into seat groups. In a second step 404, the available boarding paths are allocated to the seat groups.

Optionally, directing information may be displayed on the display units, in order to direct the passengers in accordance with the allocated boarding paths (step 406).

The invention claimed is:

1. A computing unit for allocating at least two boarding paths, available for boarding a means of transport, in particular an aircraft, to a plurality of passengers of the means of transport, the computing unit being configured to:
    form two or more changeable seat groups from a plurality of seats provided in the means of transport and to allocate the boarding paths, available for boarding the means of transport, to the two or more seat groups formed,
    receive information, from a detecting system located at least in at least one location in the means of transport, indicating whether each passenger of the plurality of passengers has boarded the means of transport, and
    update the two or more seat groups based on the information from the detecting system.

2. The computing unit according to claim 1, the computing unit being configured to allocate in each case exactly one, in particular the shortest, of the boarding paths to each of the two or more seat groups formed.

3. The computing unit according to claim 1, the computing unit being configured to carry out, repeatedly, in particular periodically, the formation of the two or more seat groups and the allocation of the boarding paths to the two or more seat groups formed based on at least the received information from the detecting system.

4. The computing unit according to claim 1, wherein the two or more seat groups are changeable by user-assisted inputs, in particular by information inputted into the computing unit, and/or by information transmitted to the computing unit.

5. The computing unit according to claim 1, the computing unit being configured to carry out the formation of the two or more seat groups and/or the allocation of the boarding paths to the two or more seat groups formed on the basis of information about the passengers, said information comprising information about at least one of the number and the seats of passengers who have boarded the means of transport.

6. The computing unit according to claim 5, wherein the computing unit is configured to carry out the formation of at least one of the two or more seat groups and the allocation of the boarding paths to the two or more seat groups formed on the basis of information about the plurality of seats, said information comprising at least one of:

information about the number of seats available for the passengers in the means of transport, information about the number of seats actually booked by the passengers, and information about the arrangement of the seats available in the means of transport.

7. A directing system for directing passengers of a means of transport, in particular of an aircraft, along boarding paths available for boarding the means of transport, the directing system comprising:

a computing unit according to claim 1;

the detecting system provided in at least one location in the means of transport; and one or more display units for displaying directing information for directing the passengers along the boarding paths allocated to the seat groups by the computing unit.

8. The directing system according to claim 7, wherein the computing unit is connected to the one or more display units in at least one of a wireless and a wired manner for the transmission of the directing information to be displayed.

9. The directing system according to claim 7, wherein the one or more display units is placed on at least one of the gate of an airport and passenger boarding bridges leading to the means of transport and gangways leading to the means of transport and buses serving for transport to the means of transport, and/or the one or more display units being configured as or being included in mobile terminals, respectively.

10. The directing system according to claim 7, further comprising an input unit for inputting information for changing the displayed boarding path provided at least on a partial quantity of the one or more display units.

11. The directing system according to claim 7, wherein the directing system comprises at least one RFID reader configured to read an RFID tag in order to determine whether each passenger of the plurality of passengers has boarded the means of transport.

12. The directing system of claim 11, wherein the directing system comprises a plurality of RFID readers arranged at a plurality of positions along the boarding path in addition to the at least one location in the vehicle.

13. The directing system of claim 11, wherein at least one RFID reader is arranged at or above at least one of:

at least one seat of the vehicle; and on at least one display unit of the directing system.

14. A method for allocating boarding paths, available for boarding a means of transport, in particular an aircraft, to passengers of the means of transport, the method comprising:

dividing, by a computing unit, a plurality of seats provided in the means of transport into two or more changeable seat groups;

allocating, by the computing unit, the boarding paths, available for boarding the means of transport, to the two or more seat groups;

receiving information, from a detecting system located at least in at least one location in the means of transport, indicating whether each passenger of the plurality of passengers has boarded the means of transport, and updating the two or more seat groups based on the information from the detecting system.

15. The method according to claim 14, the method further including displaying, by one or more display units, directing information for directing the passengers along the boarding paths allocated to the seat groups by the computing unit.

16. The method of claim 14, wherein the directing system comprises at least one RFID reader configured to read an RFID tag in order to determine whether each passenger of the plurality of passengers has boarded the means of transport.

17. The method of claim 14, wherein a plurality of RFID readers are arranged at a plurality of positions along the boarding path in addition to the at least one location in the vehicle.

18. A computer program having program code means, which, when loaded in a computer or a processor or when running on a computer or processor, causes the computer or processor to carry out a method according to claim 14.

19. A program storage medium or computer program product having the computer program according to claim 18.

20. A method for allocating boarding paths, available for boarding a means of transport, in particular an aircraft, to passengers of the means of transport, the method comprising:

dividing, by a computing unit, a plurality of seats provided in the means of transport into two or more changeable seat groups;

allocating, by the computing unit, the boarding paths, available for boarding the means of transport, to the two or more seat groups;

receiving information, from a detecting system located at least in at least one location in the means of transport, indicating whether each passenger of the plurality of passengers has boarded the means of transport, updating the two or more seat groups based on the information from the detecting system; and informing at least one passenger about the passenger's boarding path via a mobile terminal, preferably, via an application running on a mobile terminal.

* * * * *